Figure 5:
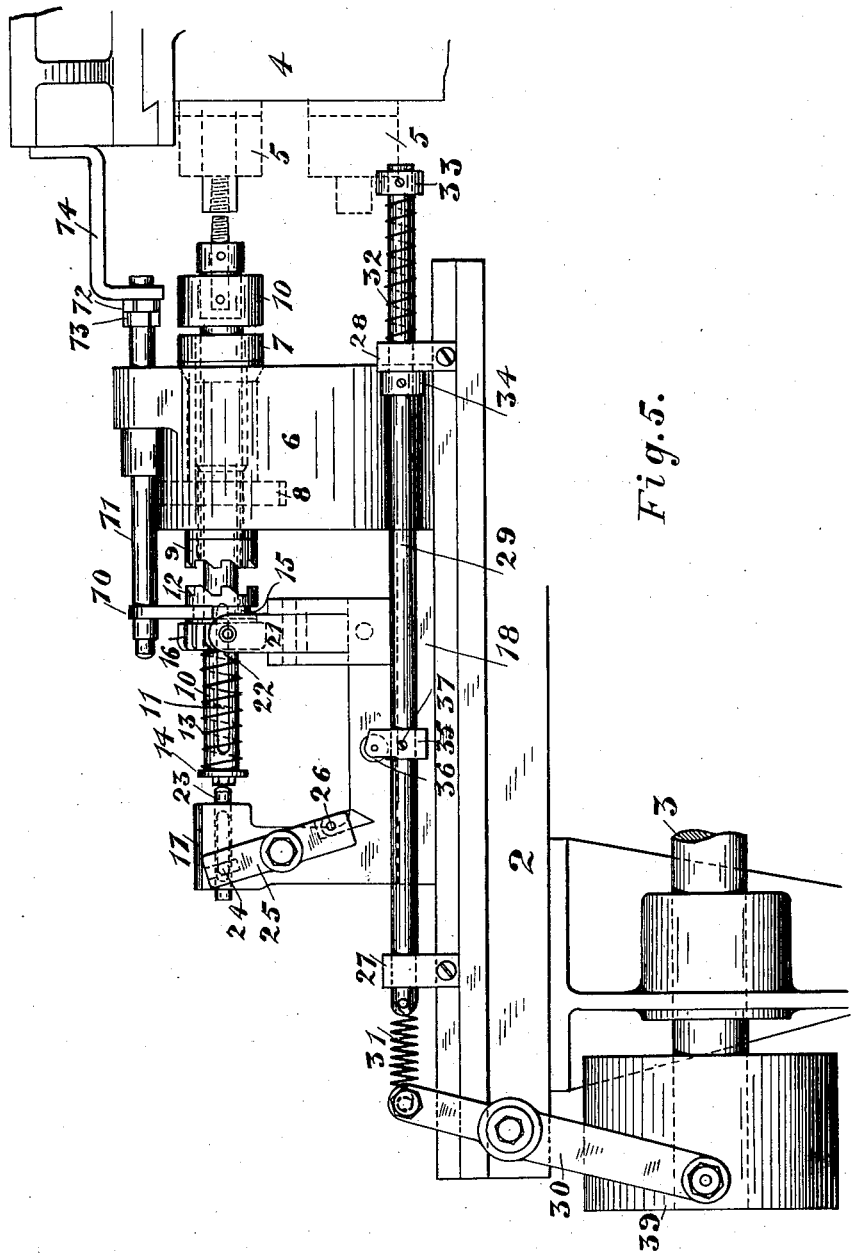

H. M. HUNTER.
THREADING MECHANISM FOR MULTIPLE SPINDLE SCREW MACHINES.
APPLICATION FILED OCT. 15, 1912.
1,111,385.  Patented Sept. 22, 1914.
3 SHEETS—SHEET 1.
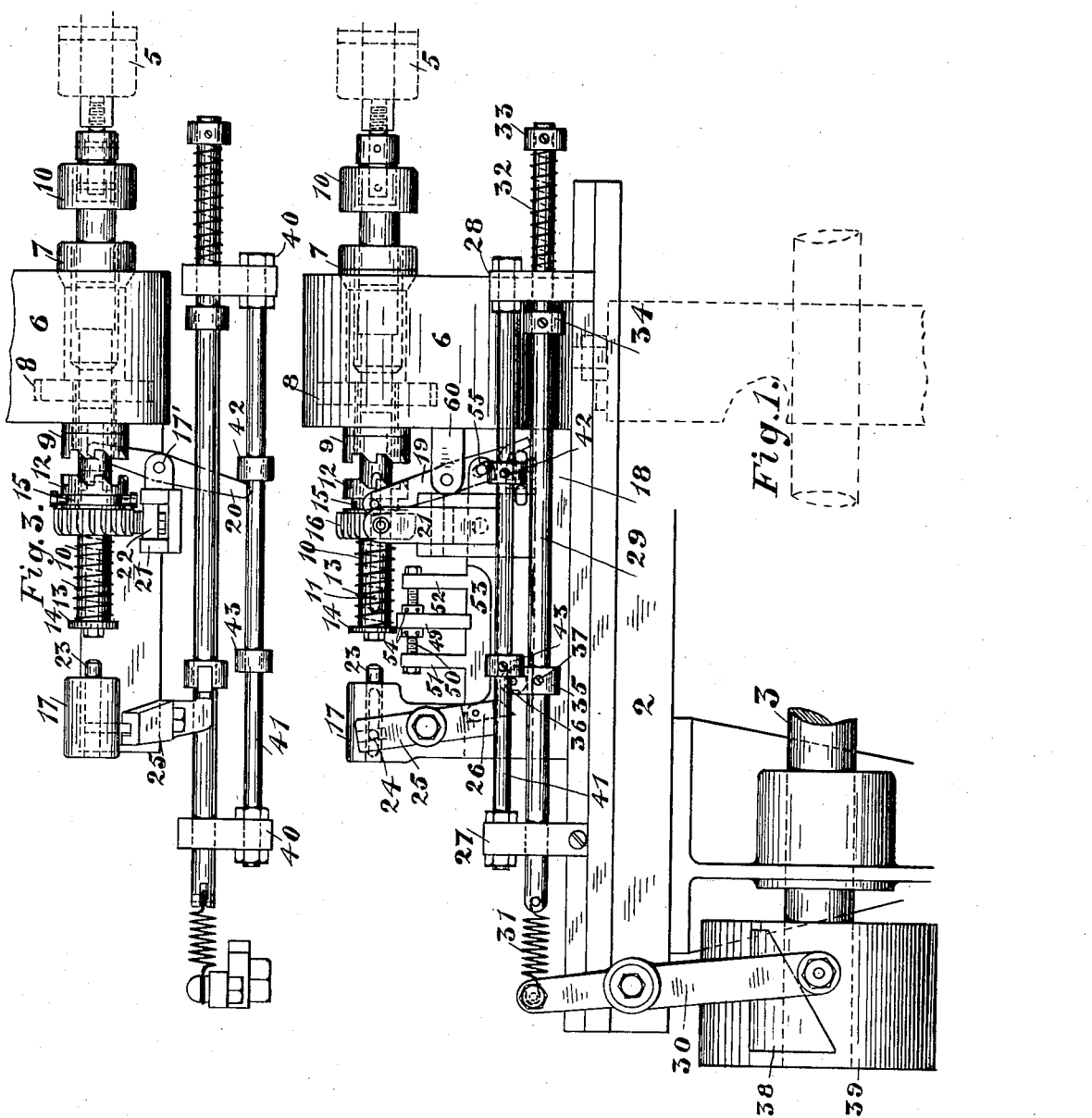
WITNESSES:
INVENTOR
Hugh M. Hunter.
BY
ATTORNEY H. M. HUNTER.
THREADING MECHANISM FOR MULTIPLE SPINDLE SCREW MACHINES.
APPLICATION FILED OCT. 15, 1912.
1,111,385.
Patented Sept. 22, 1914.
3 SHEETS—SHEET 2.
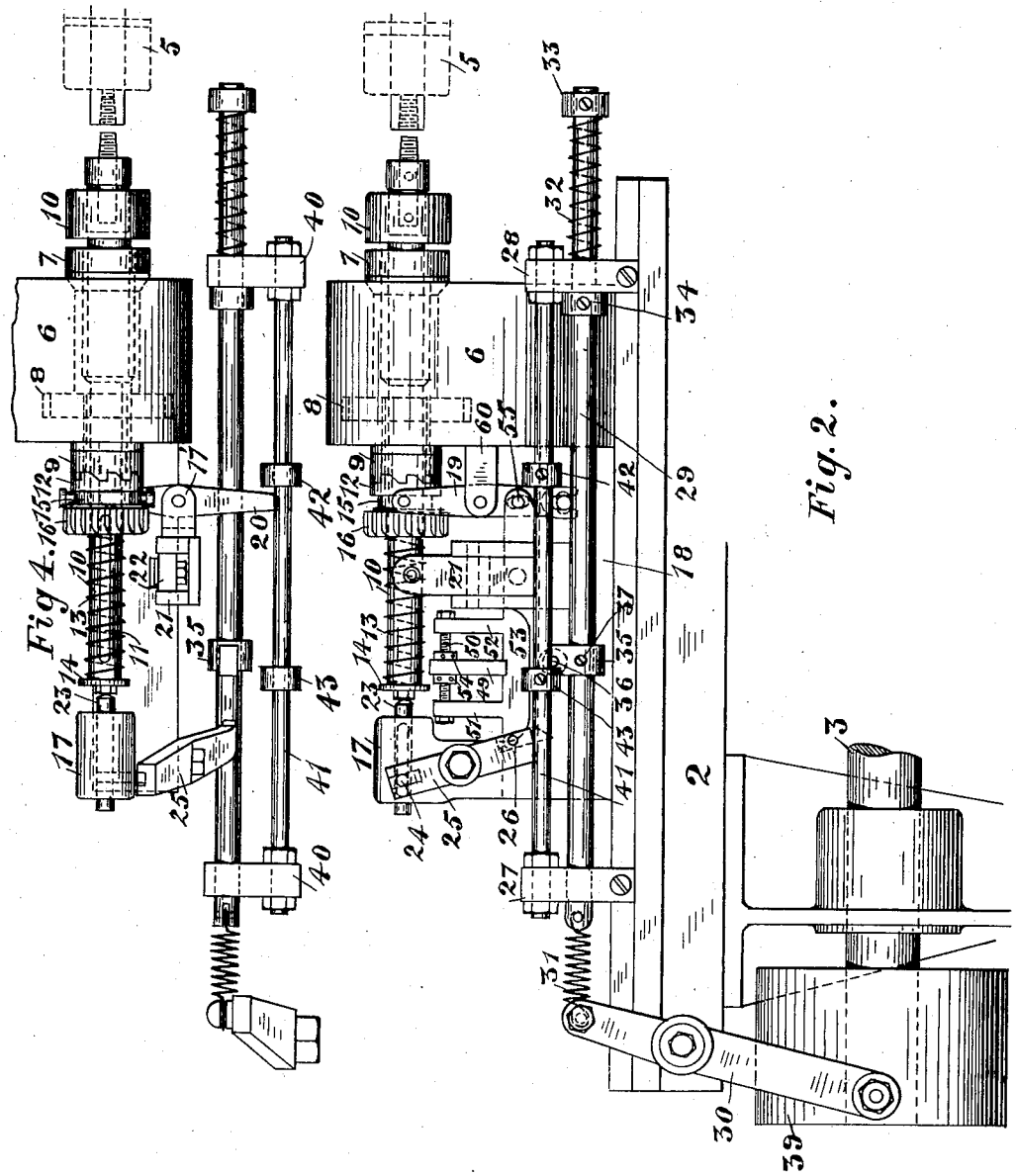
WITNESSES:
INVENTOR
Hugh M. Hunter.
ATTORNEY H. M. HUNTER.
THREADING MECHANISM FOR MULTIPLE SPINDLE SCREW MACHINES.
APPLICATION FILED OCT. 15, 1912.

1,111,385.

Patented Sept. 22, 1914.
3 SHEETS—SHEET 3.

WITNESSES:

INVENTOR
Hugh M. Hunter.
BY
ATTORNEY

UNITED STATES PATENT OFFICE.

HUGH M. HUNTER, OF CLEVELAND, OHIO, ASSIGNOR TO THE NATIONAL ACME MANUFACTURING COMPANY, OF CLEVELAND, OHIO, A CORPORATION OF OHIO.

THREADING MECHANISM FOR MULTIPLE-SPINDLE SCREW-MACHINES.

1,111,385.

Specification of Letters Patent. Patented Sept. 22, 1914.

Application filed October 15, 1912. Serial No. 725,808.

*To all whom it may concern:*

Be it known that I, HUGH M. HUNTER, a citizen of the United States, residing at Cleveland, in the county of Cuyahoga and State of Ohio, have invented certain new and useful Improvements in Threading Mechanism for Multiple-Spindle Screw-Machines, of which the following is a specification.
This invention relates to automatic multiple spindle screw machines, more particularly, however, to the threading mechanism thereof, the object of the invention being to provide an improved threading mechanism particularly adapted for use on such machines and in the use of which a considerable gain in time is obtained, and by means of which the threading may be done independently of the work being done by the other tools of the sliding tool carrier, so that the threading in the present improvement may be started at the same time that the other tools commence to work and may be finished prior to the completion of the work by any of the other tools, and by means of which also the die pins heretofore used may be done away with so that the threading operation is no longer controlled by the position of the other tools of the sliding tool carrier.

In automatic multiple spindle screw machines, as usually constructed, the threading operation must be so timed that just before the stock or work cylinder or turret indexes the tap or die, according to whichever is used, must be released from the stock or rod of the work spindle of the turret, and usually the threading operation is only entirely finished when the tool slide has traveled its extreme distance forward toward the turret and all of the tools of the tool slide or carrier have finished cutting, and in this style of machine the die or tap cannot be released until the tool slide has started to return to its initial position. This method means a considerable loss of time, for the reason that the threading operation cannot be started when the other tools of the tool slide start to cut, as the die or tap must be so adjusted that it will travel the required distance to cut the required length of thread when the other tools of the sliding tool carrier have finished or traveled their required distance to do the cutting. In other words, the threading mechanism must be so adjusted that the required length of thread will be cut and the threading operation stopped when the other tools of the sliding tool carrier have finished their cutting operation, and this means, in some instances, that the threading operation cannot commence until an appreciable time after the other tools have commenced to work or otherwise a greater length of thread will be cut or the work mutilated by reason of the increased length of time which the threading die or tap will be operated. In this old method of threading on the machines referred to, the work or stock spindle is stopped during the threading operation, and as soon as the threading operation is completed the work spindle is rotated to release the die or tap, in other words to back off the die or tap, and consequently the stock cannot be cut off until the threading is done and the work or stock spindle is revolved to release the die or tap, so that very little time is given in which to cut off because, as will be understood, the cutting off operation cannot take place until the work spindle is again revolved and after the threading is completed.

By means of the present improved mechanism, however, the threading can be started as soon as the other tools of the sliding tool carrier start to cut; and when the work has been properly threaded the required distance this threading can be automatically arrested, the work or stock spindle then revolved so as to release the die or tap, in other words back it off regardless of the position of or the work being done by the other tools of the sliding tool carrier, thus permitting the use of the stock or work spindle, on the rod of which the threading has taken place, for cutting off the finished piece. In other words, since the threading operation will be completed prior to the finishing of the work by the other tools it follows that while the other tools are still cutting this time can be utilized to cut off the work after it is threaded, whereas heretofore, as the threading mechanism had to be so adjusted as to stop when the other tools ceased work, there was but little time left to do the cutting before the turret indexed, or otherwise there would be a great loss of time. In consequence, by means of the present improvement so much time is gained by being able to thread immediately after the turret has indexed and as soon as the other tools have commenced to work and without waiting for such tools to do an appreciable amount of their work before the threading can commence, and by releasing the die or tap and revolving the stock or work spindle the moment the die or tap has traveled the desired length, regardless of whether the other tools have performed little or much of their work, that for all practical purposes the equivalent of another work spindle is obtained. In other words, by this improved mechanism twice as much work can be done within the time heretofore required for the threading operation alone on the stock spindle upon which the threading die is operating as was heretofore possible.

Of course it will be understood that the greatest saving of time is obtained where the threading and cutting off of the threaded piece is done before the turret is indexed to another station, but it is not essential that the mechanism be used in this way entirely, as in practice the present improvement has proved to be a time saver when used in the regular way of threading at one station and cutting off on the next indexing of the turret, and the reason for this is, as before explained, that the threading can be started the moment the turret has indexed and the other tools commence to work and such threading automatically stopped when the piece has been threaded the desired length regardless of the timing of the other tools, while with the old method the adjustments and timing must be so made that the threading will be finished at the same time that the other tools of the sliding tool carrier have finished, so that in a great many instances the machine has to be so timed as to accommodate the speed of the tap or die. In other words, the speed of the other tools must be so retarded as to accord with the speed of the tap or die, whereas by means of the present improved mechanism this is unnecessary, since the tap or die will commence to thread when the other tools commence their work and therefore has ample time within which to complete its threading operation before the other tools have finished their work.

Another improvement over the old threading spindle mechanism is that there are no die pins either on the live or the dead spindle, that is to say in the old method of threading the live and dead spindles carried coöperating die pins at the front of the sliding tool carrier for engagement, and these die pins had to be machined the proper length for the desired length of thread to be cut minus the lead of the cam on the cam drum which carried the tool slide forward, and there was always danger of these die pins after they were disconnected again picking up or bumping, so that when the die was threading up to a shoulder there was danger of scoring the same. Furthermore, in view of the fact that the drive when using these pins was at the front end of the dead and live spindles, instead of at the rear as in the present improvement, the result sometimes was, especially where the spindles became worn, a one-sided pull, whereas in the present improvement, by reason of the fact that the spindles are driven from the rear thereof by clutches the pull is evenly divided.

In conclusion, therefore, the present improved mechanism not only results in a considerable saving of time, but insures a superior threading mechanism overcoming several of the disadvantages heretofore present unless considerable care was exercised in the setting, timing and adjusting of the parts.

In the drawings accompanying and forming part of this specification Figure 1 is a side view of this improved threading mechanism and so much of a multiple spindle machine as is necessary to illustrate in order to properly show the operation of the threading mechanism. In this figure the tap is shown entered into a bar of the work spindle with the tap at the end of its threading operation and therefore the clutches for driving the tap disconnected; Fig. 2 is a similar side view or elevation, but showing the clutches connected and the tap in readiness to start its threading operation on the work spindle; Fig. 3 is a plan view of the mechanism shown in Fig. 1; Fig. 4 is a plan view of the mechanism shown in Fig. 2; and Fig. 5 is a view similar to Fig. 1, illustrating a somewhat modified form of mechanism for disconnecting the clutches.

Similar characters of reference indicate corresponding parts in the different figures of the drawings.

As hereinbefore stated, only so much of a multiple spindle machine is shown as is necessary to illustrate the present improvement, and this in the present instance comprises a part of the bed 2, the usual cam shaft 3, the rotary work turret or cylinder 4 carrying the work spindles 5, one of which only is shown in Figs. 1 to 4 and two in Fig. 5, and the sliding tool carrier 6 shiftably mounted on the bed, this sliding tool carrier being shifted toward and from the work turret 4 by the usual mechanism, not shown, carried by the cam shaft 3. This sliding tool carrier carries the usual tools for operating upon the several work spindles, and therefore carries the threading mechanism, which may be either a die or a tap as the case may be. Housed in the tool slide 6 is the driving or live spindle 7, which is driven by suitable gearing, one only of which, as 8, fixed to said driving spindle is it necessary to show. On the rear end of this spindle is a ratchet clutch 9. Extending through the driving or live spindle is the loose or dead spindle 10 on the rear end of which is fastened a key 11 on which is another ratchet clutch 12 adapted to coöperate with the clutch 9, and these clutches are machined on their faces so as to engage each other. Directly back of the clutch 12 is a coil spring 13 held in place by a collar 14 on the rear end of the spindle 10. This spring holds the clutch 12 in engagement with the clutch 9 so that the live spindle 7, through the medium of the clutch members, drives the dead or loose spindle 10 by means of the gear 8. The clutch member 12 has a groove 15 in its periphery, and in the rear thereof a series of ratchet teeth 16. To a bracket 60 projecting from the rear of the tool carrier is pivoted a lever 19, to the crotched upper end of which lever are fastened rollers which fit into the groove 15 of clutch member 12. The lower end of this lever 19 is also crotched to fit over a stud carried by the end of a lever 20, although it may be linked thereto if preferred, which lever 20 will be operated by stops hereinafter described thereby to operate the lever 19 to shift the clutch member 12. This lever 20, the inner end of which operates the lever 19 to shift the clutch member, is pivoted to an extension 17' of the bracket 17 in such a manner that its outer free end will project far enough to come in contact with the collars 42 and 43 hereinafter described. Secured to the bracket 17, which bracket is fastened to the tool slide 18 carrying the tool carrier 6, is a post 21, which therefore shifts with the tool carrier, and this post carries a pawl 22 in position to engage the ratchet teeth 16 of the clutch member 12 at the proper time and when the clutches are disengaged, thereby to lock the driven or dead spindle 10 and so prevent the tap or die from rotating when the stock spindle is rotated to back off the tap or die.

In the upstanding part of the bracket 17 is housed a plunger 23 having a pin 24 engaging a lever 25 pivoted to the bracket 17, and on the lower end of this lever 25 is a projection or finger 26. To the bed of the machine are bolted two brackets 27 and 28 a suitable distance apart and which form a bearing for a kicker rod 29. Also pivoted to the bed of the machine is a lever 30, the upper end of which is connected to the rod 29 by means of a coil spring 31. On the opposite end of the rod 29 is also a coil spring 32 held in position between the bracket 28 and the collar 33, a similar collar 34 being located at the inner side of the bracket 28. Carried by this kicker rod 29 is a dog 35 having a roller 36, this dog being adjustable on the rod by means of a set screw 37. The lever 30 is operated at the proper time by means of a cam 38 on the cam drum 39 mounted on the cam shaft 3, thereby to carry the dog 35 into engagement with the projection 26 of the lever 25 for the purpose of shifting the driven or dead spindle 10 forward on to the work after the engagement of the clutch members 9 and 12. The springs 31 and 32 not only act as cushions for the kicker rod 29, but also overcome any inaccuracy of the adjustments.

In extensions 40 of the brackets 27 and 28 is secured a fixed rod 41, on which are adjustably secured a pair of collars or stops 42 and 43 for engagement during the back and forth movement of the tool carrier slide with the end of the lever 20 hereinbefore described, thereby to shift the clutch member 12.

A safety dog 49 is provided for the purpose of tripping or disconnecting the clutch members 9 and 12 during the forward travel of the tap or die when threading, and is operative to do this at the time when the lever 20 would do it if properly actuated. This is for the purpose of stopping the threading operation should the travel of the tool slide forward be arrested accidentally or otherwise after the tap or die has started to work upon the stock in case the lever 20 should not come in contact with the collar or stop 42. The safety device will thus disconnect the clutches independently of the lever 20 and so avoid breakage of the tap or die. This safety dog or device 49 is carried by a screw 50 mounted in a pair of extensions 51 and 52 of a suitably supported sliding bracket 53 and adjusted by means of a pair of nuts 54 so that it will be engaged by the collar 14 at the proper time and thereby be shifted. This bracket is connected by a pin 55 with the lever 19, so that on the forward travel of the die or tap it will, according to the adjustment of the safety dog 49, engage the same and thus shift the lever 19 and disengage the clutches.

In the construction shown in Fig. 5, the means for disconnecting the clutch members comprises a crotched lever 70 projecting into the groove 15 of the sliding clutch member. This crotched lever 70 is carried by a rod 71 supported by the tool carrier 6. On the opposite end of this rod 71 is an adjusting nut 72, forming a stop, and a check nut 73 adapted to be adjusted to come into engagement with a bracket 74 projecting in front of the work turret or cylinder casing so that the nut 72 will at a predetermined time, and on the forward movement of the sliding tool carrier, engage the bracket 74 and thus, through the medium of the rod 71, which is mounted to slide relatively to the tool carrier, shift the sliding clutch member carried by the driven or dead spindle away from the clutch member carried by the live spindle and thus disconnect the clutch members and shift the sliding clutch member into engagement with the pawl 22 and so stop the further rotation of the tap or die in the manner described herein.

It will be understood, of course, that the bracket 74 is crotched at its lower end so that the end of the rod 71 can pass under the same and bring the nut 72 into engagement with the bracket and can also move away from such bracket when the sliding tool carrier is shifted, and at which time the spring 13 will again force forward the sliding clutch member into engagement with the clutch member carried by the live spindle. Thus it will be seen that in this form the rod 71 is slidingly supported in the bearing on the tool slide while the nuts 72 and 73 are adjustable so as to change the timing of the clutch shifter, and that the coil spring above referred to maintains the clutch members in engagement except when the nut 73 comes into engagement with the bracket 74.

From the foregoing it will be seen that when the sliding tool carrier moves forward the required length of travel the nut 72 comes into contact with the bracket 74 and through the continued travel of the tool slide disconnects the clutch members and so arrests the threading operation in the manner herein described, and the instant the die or tap is released from the work in the manner stated the coil spring 13 re-connects the clutch members. It will thus be seen that in both forms of the improvement the live and dead spindles are connected by a pair of clutch members, which connection is controlled by a clutch shifter the operation of which is controlled by an adjustable stop or stops the timing of which can be readily changed, so that the time when the clutch shifter will be operated may be changed according to the work to be done.

The improved threading mechanism shown in Figs. 1 to 4 operates in the following manner: In Fig. 2 the driving and driven spindles 7 and 10 are in drive; that is to say, the two clutch members 9 and 12 are in engagement and the tool slide has traveled the length of the cam on the cam drum, in which position it will be observed that the tap does not quite reach the bar or stock in the work spindle it has just tapped. This is the proper setting, and the parts are set in this manner so that after the tap has threaded the work and been released it will not be carried forward again by the tool slide and so engage the work a second time. As stated, the tap has just finished the work and been released or backed off therefrom, during all of which backing off of course, as hereinbefore described, the two clutch members are out of engagement and the driven or dead spindle maintained stationary, but as the sliding tool carrier recedes away from the turret the lever 20 has been brought into engagement with the collar or dog 43 and reengaged the clutch members. After all of the tools have cleared their work the work turret is indexed one station and as the tool slide recedes away from the turret and starts forward the lever 30 is, by means of the cam 38 on the cam drum 39 of the cam shaft 3, shifted and it thereupon, through the medium of the spring 31, shifts the kicker rod 29 and so carries the dog 35 into contact with the finger 26 of the lever 25, which thereupon thrusts forward the plunger 23 and forces the dead or driven spindle 10 forward relatively to the shiftable clutch member by reason of the key slot connection therewith, while such clutch members remain in engagement so that the tap or die will be brought into engagement with the work or stock in the work spindle which is in alinement with such such tap or die, whereupon the proper threading of the work will take place during the forward movement of the tool slide, the shiftable clutch member having, as stated, been previously brought into engagement with the fixed clutch member on the driving spindle during the receding movement of the slide from the turret, which carried the lever 20 into engagement with the stop or collar 43 carried by the fixed rod 41. The clutch members remain in engagement and drive the tap or die until the free end of the lever 20, see Fig. 3, comes into engagement with the stop or collar 42 on the fixed rod 41, which has been properly set for this purpose, whereupon this lever 20 operates the lever 19 to trip or disconnect the shiftable clutch member 12 from the fixed clutch member 9, at which time of course the threading operation is completed and the ratchet teeth 16 carried by the shiftable clutch member 12 will be brought into engagement with the pawl 22, so that as the work spindle is rotated in the proper direction the further rotation of the driven tap or die spindle is prevented by the pawl and consequently the tap or die will be backed off from the work. When all the other tools in the tool slide have finished or traveled the required distance the tool slide returns or recedes to its initial position away from the work turret or cylinder, and as it so recedes the end of the lever 20 again comes into contact with the dog 43 and so re-connects the clutch members 9 and 12 in the manner hereinbefore described.

From the foregoing it will thus be seen that the threading operation can commence at any time after the clutches are connected, the plunger 23 being simply used to start the tap or die on to the work, and that as soon as the work has been completely threaded, and even though the other tools have not finished their operations, the clutch members will be disengaged and the tap or die stopped, so that as the rotation of the work is started up the tap or die will back off, and as this may occur long prior to the time when the other tools have finished their work it follows that other operations, as for instance the cutting off of the threaded piece, can immediately commence so that the piece be completely finished before the turret is ready to index to another station. Thus in the present improvement it is not necessary that the tap or die be so adjusted as to finish the threading operation at the same time that the other tools finish their work.

I claim as my invention:

1. In a machine of the class described, the combination of a driving spindle and a non-reversible driven spindle, a clutch member fixed on one of said spindles, a coöperating clutch member slidable on the other of said spindles and adapted to rotate said driven spindle in one direction, lever mechanism in engagement with said slidable clutch member, and adjustable means carried by the bed of the machine and adapted to trip said lever mechanism thereby to connect or disconnect said clutch members.

2. In a machine of the class described, the combination of a driving spindle and a non-reversible driven spindle, the latter adapted to carry a threading tool, a pair of clutch members carried by said spindles and adapted to rotate said driven spindle in one direction, lever mechanism in engagement with one of said clutch members, and adjustable stops carried by the bed of the machine and adapted to trip said lever mechanism thereby to connect or disconnect said clutch members.

3. In a machine of the class described, the combination of a driving spindle and a driven spindle, the latter adapted to carry a threading tool, a pair of clutch members carried by said spindles, lever mechanism in engagement with one of said clutch members, adjustable stops carried by the bed of the machine and adapted to trip said lever mechanism thereby to connect or disconnect said clutch members, and means independent of said lever mechanism for stopping the rotation of the driven spindle when the clutches are disconnected.

4. In a machine of the class described, the combination of a driving spindle and a driven spindle, the latter adapted to carry a threading tool, a clutch member fixed on said driving spindle, a coöperating clutch member slidable on said driven spindle and provided with a series of ratchet teeth, a pivoted lever having one end engaging said slidable clutch member, a pivoted lever engaging the opposite end of said first lever, adjustable stops carried on the bed of the machine and adapted to trip said last lever thereby to connect or disconnect said clutch members, and a pawl adapted to engage said ratchet teeth for stopping the rotation of the driven spindle when the clutch members are disconnected.

5. In a machine of the class described, the combination of a driving spindle and a driven spindle, the latter adapted to carry a threading tool, a pair of clutch members carried by said spindles, lever mechanism in engagement with one of said clutch members, adjustable stops carried by the bed of the machine and adapted to trip said lever mechanism thereby to connect or disconnect said clutch members, means for maintaining said clutches in operative engagement, and means independent of said lever mechanism for stopping the rotation of the driven spindle when the clutch members are disconnected.

6. In a machine of the class described, the combination with the bed of the machine, of a driving spindle and a driven spindle, the latter adapted to carry a threading tool, a pair of clutch members carried by said spindles, lever mechanism for disconnecting the clutches, adjustable stops carried by said bed for controlling the operation of said lever mechanism, pawl and ratchet mechanism for stopping the rotation of the driven spindle when the clutches are disconnected, means for maintaining said clutches in operative engagement and comprising a spring, and means for kicking forward the driven spindle to start the work.

7. In a machine of the class described, the combination of a driving spindle and a driven spindle, the latter adapted to carry a threading tool, a pair of clutch members carried by said spindles, one of said clutch members provided with a series of ratchet teeth, a pivoted lever having one end engaging one of said clutch members, a pivoted lever engaging the opposite end of said first lever, adjustable stops carried on the bed of the machine in position to trip said lever thereby to connect or disconnect said clutch members at the proper time, and a pawl adapted to engage said ratchet teeth on the disconnection of said clutch members thereby to stop the rotation of one of said spindles.

8. In a machine of the class described, the combination of a driving spindle and a driven spindle, the latter adapted to carry a threading tool, a pair of clutch members carried by said spindles, one of said clutch members provided with a series of ratchet teeth, a pivoted lever having one end engaging said ratchet-toothed clutch member, a pivoted lever engaging the opposite end of said first lever, adjustable stops carried on the bed of the machine in position to trip said lever thereby to connect or disconnect said clutch members at predetermined times, a pawl adapted to engage said ratchet teeth on the disconnection of said clutch members thereby to stop the rotation of said driven spindle, and means for kicking forward the driven spindle to start the work after the engagement of the clutch members.

9. In a machine of the class described, the combination of a sliding tool carrier, a driving spindle and a driven spindle carried thereby and extending one through the other, a pair of clutch members carried by said spindles, lever mechanism having one end in engagement with one of said clutch members, a pair of adjustable stops carried by the bed of the machine and adapted to trip the opposite end of said lever mechanism on the reciprocations of said tool carrier thereby to connect or disconnect said clutch members, and means for maintaining said clutch members in engagement.

10. In a machine of the class described, the combination of a sliding tool carrier, a driving spindle and a driven spindle carried thereby and extending one through the other, a pair of clutch members carried by said spindles, lever mechanism having one end in engagement with one of said clutch members, a pair of adjustable stops carried by the bed of the machine and adapted to trip the opposite end of said lever mechanism on the reciprocations of said tool carrier thereby to connect or disconnect said clutch members, means for maintaining said clutch members in engagement, and means coöperating with one of said clutch members for stopping the rotation of said driven spindle when the clutch members are disconnected.

11. In a machine of the class described, the combination of a driving spindle and a driven spindle, means for connecting said spindles, means for disconnecting said connecting means at predetermined times, adjustable means for determining the connecting and disconnecting of said means, and auxiliary means for determining the disconnection of said means, said auxiliary means forming a safety device.

12. In a machine of the class described, the combination of a driving spindle and a driven spindle, the latter adapted to carry a threading tool, a pair of clutch members carried by said spindles, clutch shifter mechanism for disconnecting the clutches, adjustable stops for controlling the operation of said clutch shifter mechanism, and auxiliary means for controlling the disconnection of said clutch shifter mechanism and forming a safety device.

13. In a machine of the class described, the combination of a driving spindle and a driven spindle, the latter adapted to carry a threading tool, a pair of clutch members carried by said spindles, clutch shifter mechanism for disconnecting the clutches, adjustable stops for controlling the operation of said clutch shifter mechanism, auxiliary means for controlling the disconnection of said clutch shifter mechanism and forming a safety device, and means for stopping the rotation of the driven spindle when the clutches are disconnected.

14. In a machine of the class described, the combination of a sliding tool carrier, a driving and a driven spindle carried thereby, means for connecting the same at predetermined times, means for controlling said connection, means operative on the reciprocations of the sliding tool carrier for operating said controlling means and adjustable to change the timing of said operating means, and auxiliary means for severing the connection between the driving and driven spindles at a predetermined time.

15. In a machine of the class described, the combination of a sliding tool carrier, a driving and a driven spindle carried thereby, means for connecting the same at predetermined times, means for controlling said connection, means operative on the reciprocations of the sliding tool carrier for operating said controlling means and adjustable to change the timing of said operating means, and auxiliary means for severing the connection between the driving and driven spindles at a predetermined time and brought into operation on the stoppage of the forward travel of the tool carrier.

16. In a machine of the class described, the combination with a work turret and a sliding tool carrier, of threading mechanism including a driving and a non-reversible driven spindle and a pair of coöperating clutch members carried by said spindles and adapted to rotate said driven spindle in one direction, and means for operating said threading mechanism whereby it may commence and finish its work prior to the other tools of the carrier finishing their work, said means including lever mechanism in engagement with one of said clutch members and means carried by the bed of the machine and adapted to trip said lever mechanism thereby to connect or disconnect the clutch members.

17. In a machine of the class described, the combination with a sliding tool carrier and a work turret, of threading mechanism and means for driving the same from the rear of the carrier and comprising a pair of clutches, and means for throwing said clutches into and out of operation on the movement of the sliding tool carrier and comprising a pivoted lever having one end engaging one of said clutches, a pivoted lever in engagement with the opposite end of said first lever and adjustable stops carried by a fixed part of the machine for tripping said lever thereby to connect or disconnect said clutches.

18. In a machine of the class described, the combination with a sliding tool carrier and a work turret, of threading mechanism and means for driving the same from the rear of the carrier and comprising a pair of clutches, and means for throwing said clutches into and out of operation on the movement of the sliding tool carrier and comprising a pivoted lever having one end engaging one of said clutches, a pivoted lever in engagement with the opposite end of said first lever, adjustable stops carried by a fixed part of the machine for tripping said lever thereby to connect or disconnect said clutches, and cam actuated means for kicking the threaded mechanism onto the work after the engagement of the clutch members.

19. In a machine of the class described, the combination with a live spindle and a dead spindle, of a pair of clutches carried by said spindles, one slidable relatively to the dead spindle, means for connecting and disconnecting said clutches on the sliding movement of the tool carrier and comprising lever mechanism in engagement with said slidable clutch and a pair of stops adapted to trip said lever mechanism, and a spring encircling the dead spindle between the sliding clutch and the end of said spindle for maintaining said clutches in engagement.

20. In a machine of the class described, the combination with a live spindle and a dead spindle, of a pair of clutches carried by said spindles, one slidable relatively to the dead spindle, means for connecting and disconnecting said clutches on the sliding movement of the tool carrier and comprising lever mechanism in engagement with said slidable clutch and a pair of stops adapted to trip said lever mechanism, a spring encircling the dead spindle between the sliding clutch and the end of said spindle for maintaining said clutches in engagement, and cam actuated means for kicking forward the dead spindle to start the work after the engagement of the clutch members.

21. In a machine of the class described, the combination with a sliding tool carrier and a work turret, of threading mechanism including a driving and a non-reversible driven spindle and a pair of coöperating clutch members carried by said spindles and adapted to rotate said driven spindle in one direction, and means for releasing the threading mechanism from the work prior to the time the tool carrier starts to move away from the work and prior to the time the other tools of the tool carrier have finished their work, said means including a pivoted lever engaging one of said clutch members, a pivoted lever in engagement with said first lever and adjustable means mounted on the bed of the machine for tripping said lever thereby to connect or disconnect said clutch members at predetermined times.

22. In a multiple spindle machine, the combination with a sliding tool carrier and a work turret, of threading mechanism including a driving and a non-reversible driven spindle, a clutch member fixed to said driving spindle, a coöperating clutch member slidable on said driven spindle and adapted to rotate said spindle in one direction, and means for operating the same thereby to start the threading simultaneously with the starting of the other tools upon the work, said means including a pivoted lever in engagement with said slidable clutch member, a pivoted lever engaging said first lever and an adjustable stop carried by the bed of the machine and adapted to trip said lever thereby to bring said clutch members into engagement.

23. In a multiple spindle machine, the combination with a sliding tool carrier and a work turret, of threading mechanism including a driving and a driven spindle, a clutch member fixed to said driving spindle, a coöperating clutch member slidable on said driven spindle and provided with a series of ratchet teeth, means for operating the same thereby to start the threading simultaneously with the starting of the other tools upon the work, said means including a pivoted lever in engagement with said slidable clutch member, a pivoted lever engaging said first lever and an adjustable stop carried by the bed of the machine and adapted to trip said lever thereby to bring said clutch members into engagement with each other, and a pawl adapted to coöperate with said ratchet teeth for holding the driven spindle against rotation thereby to permit the backing off of the threading mechanism prior to the time the other tools finish their work.

24. In a multiple spindle machine, the combination with a sliding tool carrier and a work turret adapted to carry a rotary work spindle, of threading mechanism operative to thread the work on the stoppage of the work spindle and to be backed therefrom on the rotation of the work spindle, said mechanism including a driving and a driven spindle, a pair of coöperating clutch members carried by said spindles, means for operating the threading mechanism to start the threading simultaneously with the starting of the cutting by the other tools, said means including lever mechanism in engagement with one of said clutch members, and a pair of adjustable stops carried on the bed of the machine and adapted to trip said lever mechanism thereby to connect or disconnect said clutch members.

25. In a multiple spindle machine, the combination with a sliding tool carrier and a work turret adapted to carry a rotary work spindle, of threading mechanism operative to thread the work on the stoppage of the work spindle and to be backed therefrom on the rotation of the work spindle, said threading mechanism including a driving and a driven spindle, a pair of coöperating clutch members carried by said spindles and one provided with a series of ratchet teeth, and means for operating the threading mechanism to start the threading simultaneously with the starting of the cutting by the other tools and comprising lever mechanism in engagement with one of said clutches, a pair of adjustable stops carried on the bed of the machine and adapted to trip said lever mechanism thereby to connect or disconnect said clutch members, and a pawl adapted to coöperate with said ratchet teeth thereby to hold the driven spindle against rotation and permit the backing off of the threading mechanism prior to the finishing of the cutting by the other tools.

26. In a multiple spindle machine, the combination with a sliding tool carrier and a work turret, of threading mechanism including a pair of clutch members, each having a single clutch face, and means for automatically arresting the threading mechanism and backing the same off prior to the finishing of the work by the other tools, said means including a pivoted lever in engagement with one of said clutch members and adjustable stops carried on a fixed part of the machine for tripping said lever.

27. In a multiple spindle screw machine, the combination with a sliding tool carrier and a work turret capable of rotation, of threading mechanism including a pair of coöperating clutch members, means for operating the same whereby immediately after indexing the turret the threading operation may commence and for releasing the threading mechanism prior to the finishing of the work by the other tools of the tool carrier, said means including a pivoted lever in engagement with one of said clutch members and adjustable stops carried on a fixed part of the machine for tripping said lever.

28. In a machine of the class described, the combination of supporting means, a sliding tool carrier carried thereby, a cam shaft carrying a cam, a driving and a driven spindle carried by said tool carrier, the driven spindle adapted to carry a threading tool, a pair of clutch members carried by said spindles and one slidingly supported relatively to one of said spindles, mechanism for disconnecting the clutches and including a pivoted lever in engagement with one of said clutches and adjustable stops carried by the supporting means for controlling the operation of said lever, means for maintaining said clutches in operative engagement, and means actuated by the cam on the cam shaft for kicking forward the driven spindle to start the work.

29. In a machine of the class described, the combination of supporting means, a sliding tool carrier carried thereby, a cam shaft carrying a cam, a driving and a driven spindle carried by said tool carrier, the driven spindle adapted to carry a threading tool, a pair of clutch members carried by said spindles and one slidingly supported relatively to one of said spindles and having ratchet teeth, mechanism for connecting and disconnecting the clutches and comprising a pivoted lever in engagement with one of said clutches, a pivoted lever in engagement with said first lever and adjustable stops carried by the supporting means for controlling the operation of this lever, a spring for maintaining said clutches in operative engagement, means actuated by the cam on the cam shaft for kicking forward the driven spindle to start the work after the engagement of the clutch members, and a pawl for engaging said ratchet teeth on the disconnection of the clutch members thereby to stop the rotation of the driven spindle.

30. In a machine of the class described, the combination of supporting means, a sliding tool carrier carried thereby, a cam shaft carrying a cam, a driving and a driven spindle carried by said tool carrier, the driven spindle adapted to carry a threading tool, a pair of clutch members carried by said spindles and one slidingly supported relatively to one of said spindles and having ratchet teeth, mechanism for connecting and disconnecting the clutches and comprising a pivoted lever in engagement with one of said clutches and adjustable stops carried by the supporting means for tripping said lever, a spring encircling said driven spindle for maintaining said clutches in operative engagement, means actuated by the cam on the cam shaft for kicking forward the driven spindle to start the work after the engagement of the clutch members, a pawl for engaging said ratchet teeth on the disconnection of the clutch members, and auxiliary means brought into operation on the stoppage of the forward travel of the sliding tool carrier for disconnecting said clutch members.

31. In a machine of the class described, the combination of supporting means, a sliding tool carrier mounted thereon, a driving and a driven spindle carried by said tool carrier, said driven spindle being mounted within the driving spindle and movable lengthwise relatively thereto and adapted to carry a threading tool, a pair of clutch members carried by said spindles, that carried by the driven spindle being slidingly mounted thereon, mechanism for connecting and disconnecting the clutches and comprising a pivoted lever in engagement with said sliding clutch member and adjustable stops carried by the supporting means for tripping said lever, and a spring for maintaining said clutches in operative engagement during a predetermined time.

32. In a machine of the class described, the combination of supporting means, a sliding tool carrier mounted thereon, a driving and a driven spindle carried by said tool carrier, said driven spindle being mounted within the driving spindle and movable lengthwise relatively thereto and adapted to carry a threading tool, a pair of clutch members carried by said spindles, that carried by the driven spindle being slidingly mounted thereon, clutch shifter mechanism for disconnecting the clutches, adjustable stops carried by the supporting means for controlling the operation of said clutch shifter mechanism, means for maintaining said clutches in operative engagement during a predetermined time, and auxiliary means connected with the clutch shifter mechanism for separating the clutch members on the stoppage of the sliding tool carrier in its forward travel.

33. In a machine of the class described, the combination of supporting means, a sliding tool carrier mounted thereon, a driving and a driver spindle carried by said tool carrier, said driven spindle being mounted within the driving spindle and movable lengthwise relatively thereto and adapted to carry a threading tool, a pair of clutch members carried by said spindles, that carried by the driven spindle being slidingly mounted thereon, clutch shifter mechanism for disconnecting the clutches, adjustable stops carried by the supporting means for controlling the operation of said clutch shifter mechanism, means for maintaining said clutches in operative engagement during a predetermined time, and pawl and ratchet mechanism for stopping the rotation of the driven spindle on the separation of the clutch members, the ratchet having connection with the sliding clutch member.

34. In a machine of the class described, the combination of supporting means, a sliding tool carrier mounted thereon, a driving and a driven spindle carried by said tool carrier, said driven spindle being mounted within the driving spindle and movable lengthwise relatively thereto and adapted to carry a threading tool, a pair of clutch members carried by said spindles, that carried by the driven spindle being slidingly mounted thereon, clutch shifter mechanism for disconnecting the clutches, adjustable stops carried by the supporting means for controlling the operation of said clutch shifter mechanism, means for maintaining said clutches in operative engagement during a predetermined time, auxiliary means connected with the clutch shifter mechanism for separating the clutch members on the stoppage of the sliding tool carrier in its forward travel, and pawl and ratchet mechanism for stopping the rotation of the driven spindle on the separation of the clutch members, the ratchet having connection with the sliding clutch member.

35. In a machine of the class described, the combination of a driving spindle and a non-reversible driven spindle, a clutch member fixed to one of said spindles, a coöperating clutch member movable relatively to the other of said spindles and adapted to rotate said spindle in one direction, means extending transversely to the axis of said spindles for directly engaging the movable clutch member, and adjustable means carried by a fixed part of the machine and adapted to trip said first means thereby to connect and disconnect said clutch members.

36. In a machine of the class described, the combination with a work turret and a sliding tool carrier, of threading mechanism including a driving and a non-reversible driven spindle and a pair of coöperating clutch members carried by said spindles and adapted to rotate said driven spindle in one direction, each of said clutch members having a single clutch face, and means for operating said threading mechanism whereby it may commence and finish its work prior to the other tools of the carrier finishing their work, said means having a part thereof extending transversely to the axis of the spindles and having direct engagement with one of said clutch members, and means carried by a fixed part of the machine and adapted to trip said means thereby to connect or disconnect the clutch members.

37. In a machine of the class described, the combination of a driving spindle and a driven spindle, a clutch member fixed to one of said spindles, a coöperating clutch member movable relatively to the other of said spindles, means extending transversely to the axis of said spindles for directly engaging the movable clutch member, adjustable means carried by a fixed part of the machine and adapted to trip said first means thereby to connect and disconnect said clutch members, and independent means for stopping the rotation of the driven spindle when the clutch members are disconnected.

38. In a machine of the class described, the combination of a driving spindle and a driven spindle, a clutch member fixed to one of said spindles, a coöperating clutch member movable relatively to the other of said spindles, means extending transversely to the axis of said spindles for directly engaging the movable clutch member, adjustable means carried by a fixed part of the machine and adapted to trip said first means thereby to connect and disconnect said clutch members, and means for kicking forward the driven spindle to start the work after the engagement of the clutch members.

Signed at Cleveland, Cuyahoga county, Ohio, this 7th day of October, 1912.

HUGH M. HUNTER.

Witnesses:
S. M. MATHEWS,
W. S. CHASE.